Aug. 24, 1926.

L. R. BUCKENDALE 1,597,052

OIL BAFFLE

Filed Nov. 7, 1923

Inventor:
Laurence R. Buckendale
by
his Attorneys

Aug. 24, 1926.

L. R. BUCKENDALE 1,597,052

OIL BAFFLE

Filed Nov. 7, 1923    2 Sheets-Sheet 2

Inventor:
Lawrence R. Buckendale
by Carr & Carr,
his Attorneys

Patented Aug. 24, 1926.

1,597,052

UNITED STATES PATENT OFFICE.

LAURENCE RAYMOND BUCKENDALE, OF DETROIT, MICHIGAN, ASSIGNOR TO THE TIMKEN-DETROIT AXLE COMPANY, OF DETROIT, MICHIGAN, A CORPORATION OF MICHIGAN.

OIL BAFFLE.

Application filed November 7, 1923. Serial No. 673,264.

My invention relates to oil baffles for bearings, particularly to baffles for use in connection with the pinion shaft bearings of automobiles. It has for its principal object a baffle that will prevent oil from escaping from the lower part of the bearing where it is disposed by the pinion, thus causing the oil to be circulated through the bearing and to escape from the upper part of the bearing. The invention consists principally in placing an arcuate cup over the lower half of the bearing. The invention further consists in the parts and combinations of parts hereinafter described and claimed. In the accompanying drawing:—

Figure 1:
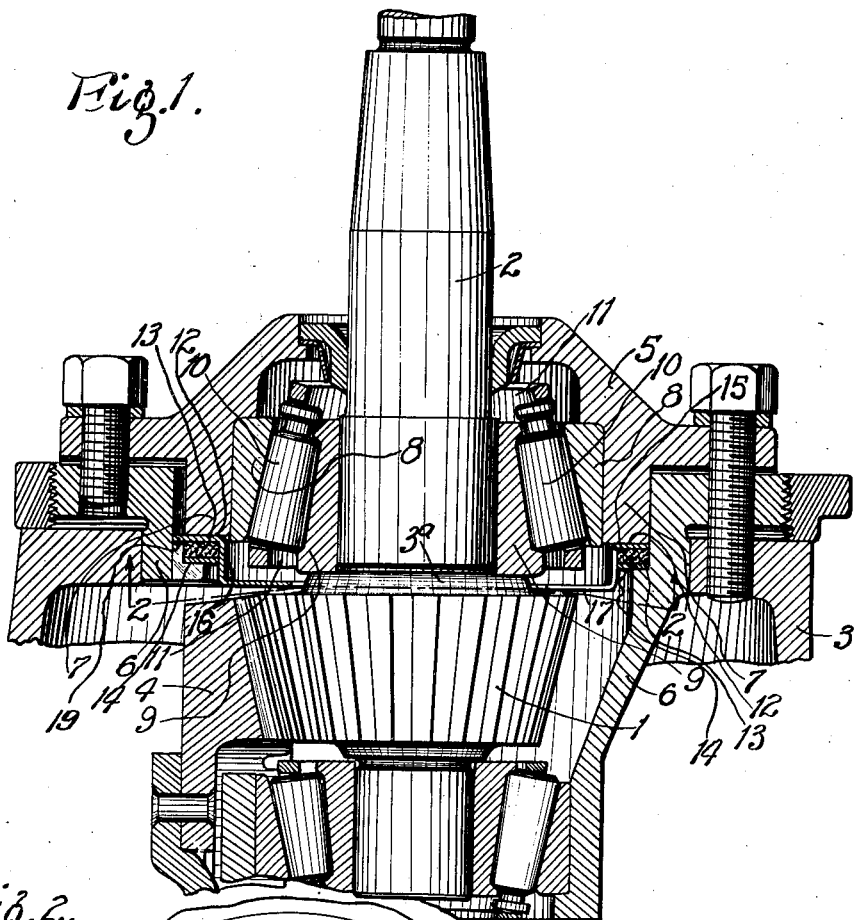
Fig. 1 is a horizontal section of a pinion shaft bearing provided with a baffle embodying my invention.
Figure 2:
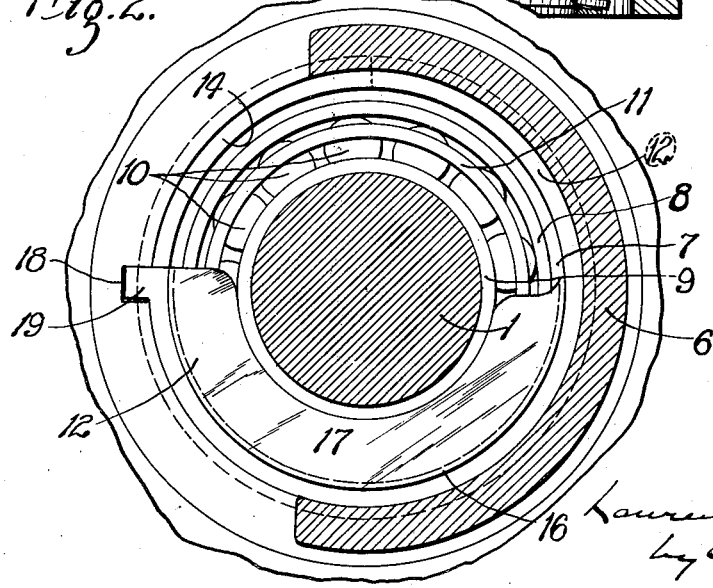
Fig. 2 is a section on the line 2—2 of Fig. 1.
Figure 3:
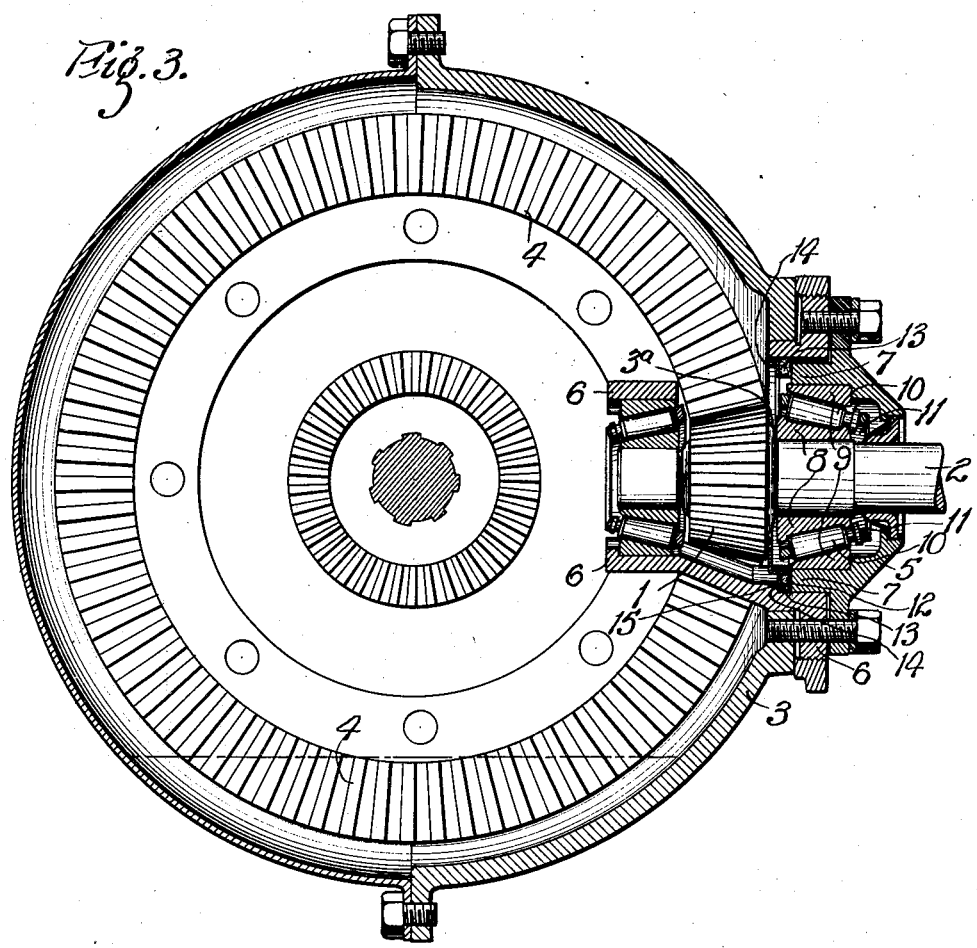
Fig. 3 is a vertical section of the device.
Figure 4:
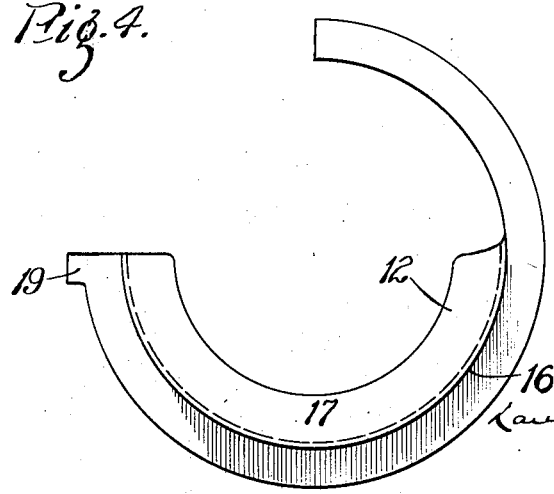
Fig. 4 is a detail view showing the construction of the baffle ring.

My oil baffle is particularly adapted for use in connection with the pinion shaft of automobiles. In such constructions, a bevel pinion 1 is mounted on the end of a shaft 2 that projects into a housing 3. The pinion has a hub portion 3ª that is of smaller diameter than the end of the pinion, but larger than the shaft. The pinion 1 meshes with a gear 4 that is mounted in the housing 3 and that dips into a pool of oil in the bottom of the housing, a portion only of the gear being shown in the drawing, as its construction is well-known.

The pinion shaft 2 is mounted in a suitable cap or support 5 that is mounted on a carrier 6 that extends into the housing. The support 5 has a tubular portion 7 that extends into the carrier. A cup or outer bearing member 8 for a conical bearing is mounted in said support 5, a cone or inner bearing member 9 is mounted on the pinion shaft with its end abutting against the end of the pinion 1 and a series of conical rollers 10 are disposed between the cup and cone, the rollers being held in a suitable cage 11.

The baffle embodying my invention is disposed at the end of the roller bearing between the bearing and the pinion. The baffle comprises an arcuate strip 12, said strip constituting about three-fourths of a circle, that is disposed against the end of the support 5. A washer 13 is placed on said strip and a metal ring 14 is placed against said washer, the metal ring 14 resting against a shoulder 15 in the carrier, so that the baffle strip 12 is firmly held in position. The baffle strip 12 is provided with a projecting flanged portion 16 that extends through about 180 degrees and terminates in a flanged portion 17 that is substantially parallel with the body portion of the baffle, the whole constituting a cup that covers the lower half of the bearing. The opening in the flanged portion is of smaller diameter than the pinion, but of greater diameter than the projecting hub portion of the pinion.

The carrier 6 is provided with a recess 18 in which is disposed a projecting ear 19 on the baffle member 12. Thus, the baffle member is held against rotation.

The operation of the baffle is as follows:

As the pinion 1 and gear 4 rotates, the gear teeth pick up oil from the bottom of the housing. When the teeth of the gear and pinion mesh, the oil is forced along the pinion toward the pinion bearing. It flows off the teeth at the large end of the pinion, on to the projecting rear portion of the pinion and from thence into the cup formed by the flanged portions of the baffle strip 12. The rotation of the bearing cage 11 and the back of the pinion causes the oil to circulate through the bearing, escape into the housing being prevented by the cupped portion of the oil baffle. The rotation of the rollers 10 and their pressure against each other causes the oil to be pumped back to the large end of the bearing, and the oil is free to escape from the upper half of the bearing, above the level of the cupped portion of the baffle. Thus, there is a constant circulation of fresh oil through the bearing, new oil being fed to the bearing from the pinion and the oil in the bearing being free to escape therefrom.

The herein described oil baffle has numerous advantages. It forces a circulation of oil through the pinion bearing, and thus simplifies the problem of lubricating such bearing. The oil in the bearing is continually replaced by fresh oil.

What I claim is:—

1. In combination, a pinion shaft, a roller bearing on said pinion shaft and an oil baffle adjacent to the end of said bearing, said baffle comprising a cupped member disposed at the large end of said bearing and covering substantially the lower half of said bearing.

2. In combination, a pinion shaft, a pinion thereon, a roller bearing on said shaft, and an oil baffle between said pinion and said bearing, said baffle comprising an arcuate strip covering substantially the lower half of said bearing.

3. An oil baffle for pinion shaft bearings and the like comprising a ring shaped strip extending through about three quarters of a circle, said strip having a flanged portion extending through about a semicircle, said flanged portion terminating in an arcuate flange that is substantially parallel with said strip.

4. The combination with a pinion shaft, a pinion thereon, a gear meshing with said pinion, said gear being adapted to dip into a supply of oil, and a roller bearing on said pinion shaft, of an oil baffle between said pinion and said roller bearing comprising an arcuate member covering substantially the lower half of said bearing.

5. The combination with a pinion shaft, a pinion thereon, a gear meshing with said pinion, said gear being adapted to dip into a supply of oil, and a roller bearing on said pinion shaft, of an oil baffle between said pinion and said roller bearing comprising a cupped member covering substantially the lower half of said bearing.

6. The combination with a pinion shaft, a bevel pinion thereon, said pinion having a hub portion, a gear meshing with said pinion, said gear being adapted to dip into a supply of oil, and a conical roller bearing on said pinion shaft, the inner bearing member of said bearing abutting against the hub portion of said pinion, of an oil baffle comprising an arcuate member covering substantially the lower half of said bearing, said arcuate member being disposed between said pinion and said bearing, encircling the hub portion of said pinion, the inner diameter of said arcuate member being greater than the diameter of said hub portion.

7. The combination with a pinion shaft, a bevel pinion thereon, a gear meshing with said pinion, said gear being adapted to dip into a supply of oil, a carrier having an annular shoulder in the bore thereof, a support mounted on said carrier and having a tubular portion extending into said carrier, and a conical roller bearing between said pinion shaft and support, of an oil baffle comprising an arcuate strip secured between the end of said support and the shoulder of said carrier and having projecting flanged portions constituting a cupped member covering substantially the lower half of said bearing.

8. The combination with a pinion shaft, a bevel pinion thereon, a gear meshing with said pinion, said gear being adapted to dip into a supply of oil, a carrier having an annular shoulder in the bore thereof, a support mounted on said carrier and having a tubular portion extending into said carrier, and a conical roller bearing between said pinion shaft and support, of an oil baffle comprising an arcuate strip secured between the end of said support and the shoulder of said carrier and having projecting flanged portions constituting a cupped member covering substantially the lower half of said bearing a washer and a metal ring interposed between said ring and said shoulder.

9. The combination with a pinion shaft, a pinion thereon, a gear meshing with said pinion, said gear being adapted to dip into a supply of oil, a carrier having an annular shoulder in the bore thereof, a support mounted on said carrier and having a tubular portion extending into said carrier, and a roller bearing between said pinion shaft and said support, of an oil baffle comprising an arcuate member secured between the end of said support and the shoulder of said carrier and having a projecting portion covering substantially the lower half of said bearing.

10. The combination with a pinion shaft, a pinion thereon, a gear meshing with said pinion, said gear being adapted to dip into a supply of oil, a carrier having an annular shoulder in the bore thereof, a support mounted on said carrier and having a tubular portion extending into said carrier, and a roller bearing between said pinion shaft and said support, of an oil baffle comprising an arcuate strip secured between the end of said support and the shoulder of said carrier, said strip having a flanged portion extending through substantially a semicircle, said flanged portion terminating in an arcuate flange that is substantially parallel with said strip.

Signed at Detroit, Michigan, this 29 day of Oct., 1923.

LAURENCE RAYMOND BUCKENDALE.